United States Patent [19]

Asahara

[11] 4,448,825
[45] May 15, 1984

[54] THERMALLY INSULATED CERAMIC CONTAINER AND METHOD FOR MANUFACTURE THEREOF

[76] Inventor: Toshio Asahara, 1017-31, Ouaza Uchiage, Neyagawa, Osaka, Japan

[21] Appl. No.: 353,970

[22] Filed: Mar. 2, 1982

[30] Foreign Application Priority Data

Mar. 6, 1981 [JP] Japan .................................. 56-32755

[51] Int. Cl.³ .................. A47J 41/00; H05B 3/68; C04B 33/34; B32B 5/18
[52] U.S. Cl. .................................. 428/35; 215/12 A; 215/13 R; 220/444; 156/79; 156/89; 156/292; 264/46.6; 264/46.9
[58] Field of Search .............................. 264/46.6, 46.9; 215/13 R, 12 A; 220/444; 428/35; 156/79, 89, 292

[56] References Cited

U.S. PATENT DOCUMENTS

| | | | |
|---|---|---|---|
| 3,221,915 | 12/1965 | Gort et al. | 215/13 R |
| 3,935,044 | 1/1976 | Daly | 156/79 |
| 4,075,264 | 2/1978 | Hay | 264/46.9 |
| 4,184,601 | 1/1980 | Stewart et al. | 215/13 R |

*Primary Examiner*—William R. Dixon, Jr.
*Attorney, Agent, or Firm*—Wenderoth, Lind & Ponack

[57] ABSTRACT

A generally cylindrical thermally insulated ceramic container of imposing appearance suitable for use on dining tables comprises a double-wall ceramic container and insulation formed of a foaming resin of low thermal conductivity and contained in the inner cavity interposed between the two walls. The thermally insulated ceramic container is produced by preparing an inner green container wall and an outer green container wall one size larger, both of potter's dough, joining the two green container walls along the upper edges thereof with the walls radially opposed to each other across an intervening space (inner cavity), firing the resultant molded green double-wall container thereby producing a double-wall ceramic container, injecting an unfoamed or semi-foamed foaming resin into the inner cavity through a perforation bored in advance in the outer wall, and foaming the resin within the inner cavity.

11 Claims, 4 Drawing Figures

THERMALLY INSULATED CERAMIC CONTAINER AND METHOD FOR MANUFACTURE THEREOF

BACKGROUND OF THE INVENTION

This invention relates to a thermally insulated container typified by a thermos bottle.

Thermally insulated containers come in a rich variety of types. They invariably lock imposingness and fall short of satisfying the general preference for articles of high quality for use on dining tables.

SUMMARY OF THE INVENTION

This invention is aimed at providing a novel thermally insulated container made of a heretofore totally unthinkable ceramic material basically in a double-wall structure and a method for the manufacture of the container. The container contemplated by this invention has the appearance of a ceramic jar. The thermally insulated container, therefore, acquires a highly imposing appearance when it is finished with patterns painted on the outer surface thereof with glaze. Alternatively the container acquires a simple appearance rich in folk-craftsmanship when it is finished with its outer surface left unglazed. This invention, therefore, provides novel table-top containers of a unique concept.

The present invention will be described specifically below with reference to preferred embodiments thereof illustrated in the accompanying drawings.

DETAILED DESCRIPTION OF THE INVENTION

Figure 1:
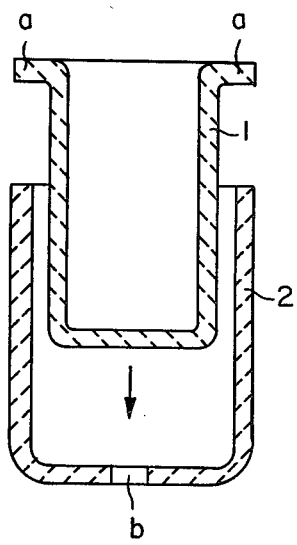
FIG. 1 is a longitudinal cross section of an inner and an outer green container wall to be used in this invention.

A dough prepared by mixing clay or some other raw material for ceramics with water is molded such as with a potter's wheel to produce an inner green container wall 1 of the shape of a wide-mouthed bottle and an outer green container wall 2 of a similar shape having a wide mouth one size larger as illustrated in FIG. 1. If, in this case, a flange "a" is formed along the circumference of the opening of either of the green container walls 1 and 2, it will facilitate the subsequent union of the two green container walls. In FIG. 1, "b" denotes a small perforation measuring about 5 mm in diameter and provided in the bottom of the outer green container wall 2.

Figure 2:
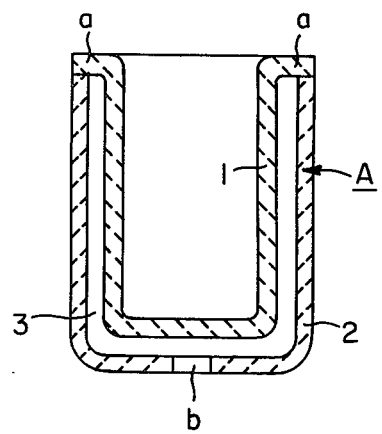
FIG. 2 is a longitudinal cross section of a double-wall container.

The inner green container wall 1 is inserted into the outer green container wall 2 until the two walls 1, 2 are set in position radially opposite each other. Then, they are intimately joined to each other along their upper edges as illustrated in FIG. 2. When the flange "a" is formed in advance in either of the two green container walls 1 and 2, the circumferential edge of this flange "a" and the upper circumferential edge of the other container wall are joined to each other by a technique known to those skilled in the art of pottery (such as, for example, the technique of using "potter's cement"). When the flange "a" is not formed in advance in either of the container walls, a green annular piece equalling the flange "a" is separately formed in advance. This annular piece is mounted to bridge the upper circumferential edges of the inner and outer green container walls 1, 2 and is joined to the edges. In this case, the bottom of the inner green container wall 1 must be kept from falling into direct contact with the bottom of the outer green container wall 2 as by holding the two container walls 1, 2 upside down or using some other effective device.

Figure 3:
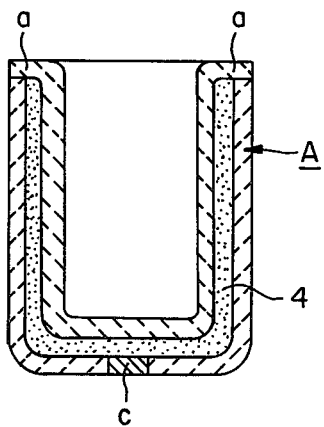
FIG. 3 is a longitudinal cross section of a thermally insulated ceramic container according to the present invention.
Figure 4:
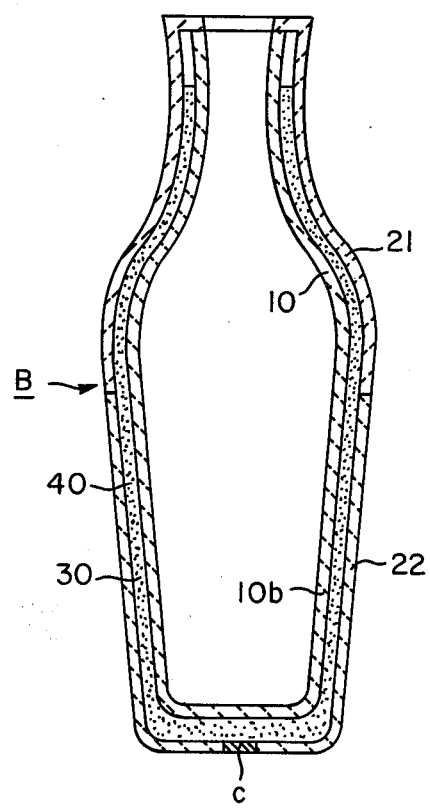
FIG. 4 is a longitudinal cross section illustrating another preferred embodiment of this invention.

When a joined green container is completed as illustrated in FIG. 2, it is dried and, with patterns painted with glaze, fired to produce a double-wall ceramic container (hereinafter referred to simply as "double-wall container"). Thereafter, a mixed solution consisting of a resin solution as a starting material for a foaming resin of low thermal conductivity (such as, for example, foaming polyurethane resin) and a foaming agent or a resin solution or granular material preparatorily foamed to a fair extent (hereinafter referred to simply as "semi-foamed material") is injected through the aforementioned perforation b in the bottom into the inner cavity 3 of the double-wall container A and foamed by use of heat or otherwise. Consequently, the product of this invention, namely a thermally insulated ceramic container having insulation 4 contained in the inner cavity 3 of the two-double-wall container A as illustrated in FIG. 3 is obtained. In the diagram, "c" denotes a stopper for the bottom. FIG. 4 represents another embodiment of this invention. The same dough as described above is molded as with a potter's wheel to produce an inner green container wall 10 of the shape of a Japanese sake server and an upper half member 21 and a lower half member 22 of an outer green container wall similar in shape but one size larger as illustrated in FIG. 4. Similarly to the former embodiment, it is desirable to have a flange a' formed in advance along the upper circumferential edge of the upper half member 21 of the outer green container wall or along the circumference of the opening of the inner green container wall 10. In the present embodiment, the inner green container wall 10 and the upper half member 21 of the outer green container wall are first joined intimately to each other along their upper circumferential edges to produce a partly molded green container having the two green members 10, 21 continue into each other. Then, to the lower edge of the upper half member 21 of the outer green container wall in the aforementioned partly molded green container, the lower half member 22 of the outer green container wall is applied upwardly so as to appear as illustrated in FIG. 4 so that the lower half member 22 of the outer green container wall and the lower half part 10b of the inner green container wall 10 are radially opposed to each other. By technique known to the pottery art, the upper edge of the lower half member 22 of the outer green container wall and the lower edge of the upper half member 21 are intimately joined to each other. The green double-wall container thus obtained is dried and, with patterns painted with glaze, fired to produce a double-wall ceramic container B. Thereafter, insulation 40 is introduced through the perforation in the bottom of the outer green container wall to fill the inner cavity 30 in the double-wall container B in the same way as in the former embodiment. In the diagram, "c" denotes a stopper.

Since the thermally insulated container of this invention contains an insulation made of a foaming resin of low thermal conductivity within the cavity of the double-wall ceramic container, it provides ample thermal insulation, with the low thermal conductivity of the ceramic material itself as a contributory factor. Outwardly, this is essentially a ceramic article. Whether it is finished with the outer surface decorated with patterns of glaze or left unglazed, there is obtained a thermally insulated container abundant with high sense never found in the conventional countertop container and quite suitable for use on a dining table. Particularly the product of this invention illustrated in FIG. 4 constitutes itself a highly convenient sake server in the winter because it is capable of keeping hot sake against quick loss of heat.

What is claimed is:

1. A thermally insulated double wall ceramic container, comprising an inner container wall and an outer container wall, cement joining said inner and outer walls with an inner cavity formed therebetween, and insulation formed of a foaming resin of low thermal conductivity contained within said inner cavity, said outer wall having an opening for insertion of said insulation into said inner cavity.

2. A method of manufacturing a thermally insulated ceramic container, comprising the steps of:
   (1) forming an inner green container wall, and an outer green container wall larger than said inner green container wall, each having an upper circumferential edge;
   (2) inserting said inner wall within said outer wall, said inner and outer walls being sized so that an inner cavity is located between said inner and outer walls when said inner wall is inserted within said outer wall;
   (3) forming an opening in said outer wall, said opening opening into said inner cavity when said inner wall is inserted within said outer wall;
   (4) intimately joining said inner and outer walls along their upper circumferential edges with cement to form a molded green double-wall container after step (3);
   (5) firing said molded green double-wall container to produce a double-wall ceramic container; and
   (6) injecting a foaming resin of low thermal conductivity into said inner cavity through said opening and foaming said resin to thereby form an insulation filling said inner cavity.

3. A method as in claim 2, wherein said cement includes potter's cement.

4. A method as in claim 2, wherein said opening is formed in the bottom of said outer wall.

5. A method as in claim 2, wherein the step of injecting comprises the step of injecting an unfoamed foaming resin.

6. A method as in claim 2, wherein the step of injecting comprises the step of injecting a semi-foamed foaming resin.

7. A method of manufacturing a thermally insulated ceramic container, comprising the steps of:
   (a) mixing raw material for ceramics with water to form a dough;
   (b) molding said dough into an inner green container wall having an upper portion and a lower portion below said upper portion and having a first upper circumferential edge on said upper portion, an upper half member having a second upper circumferential edge and a lower circumferential edge, and a lower half member having a third upper circumferential edge, said upper half member and said lower half member together when joined forming an outer green container wall larger than said inner green container wall;
   (c) forming an opening in said lower half member;
   (d) placing said upper half member over said inner wall so as to cover said upper portion;
   (e) intimately joining said upper half portion and said inner wall along said first and second upper circumferential edges with cement;
   (f) placing said lower half member over said inner wall so as to cover said lower portion, said upper and lower members being sized so that an inner cavity is formed between said upper and lower members and said inner wall;
   (g) intimately joining said upper and lower members along lower and third upper circumferential edges, respectively, with cement, to form a molded green double-wall container;
   (h) after step (g), firing said molded green double-wall container to produce a double-wall ceramic container; and
   (i) injecting a foaming resin of low thermal conductivity into said inner cavity through said opening and foaming said resin to thereby form an insulation filling said inner cavity.

8. A method as in claim 7, wherein said opening is formed in the bottom of said lower member.

9. A method as in claim 7, wherein the step of injecting comprises the step of injecting an unfoamed foaming resin.

10. A method as in claim 7, wherein the step of injecting comprises the step of injecting a semi-foamed foaming resin.

11. A method as in claim 7, wherein said cement comprises potter's cement.

* * * * *